June 16, 1931.  J. L. RAY  1,810,370
BEARING HOUSING SEAL
Filed March 1, 1927  2 Sheets-Sheet 2
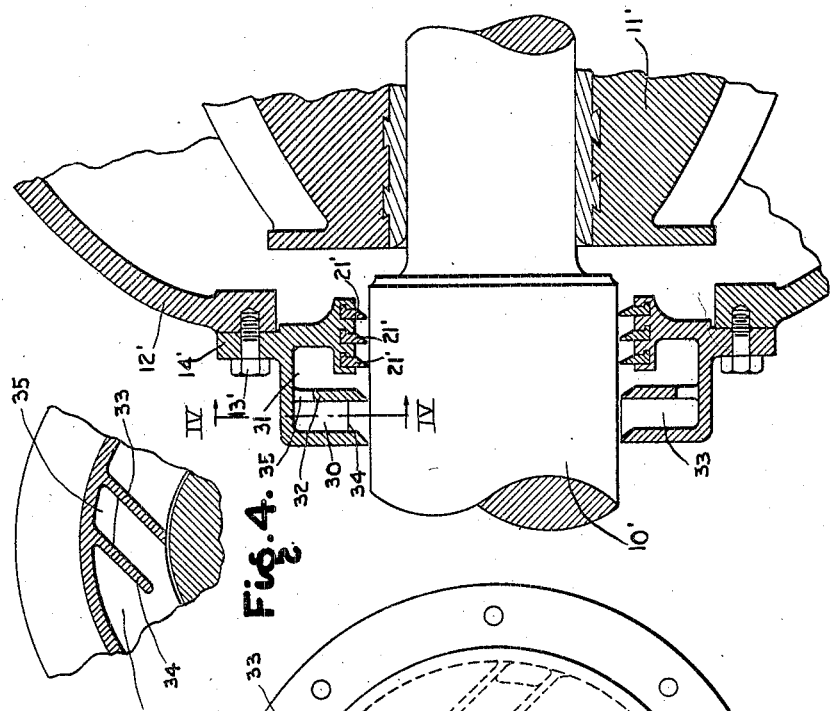
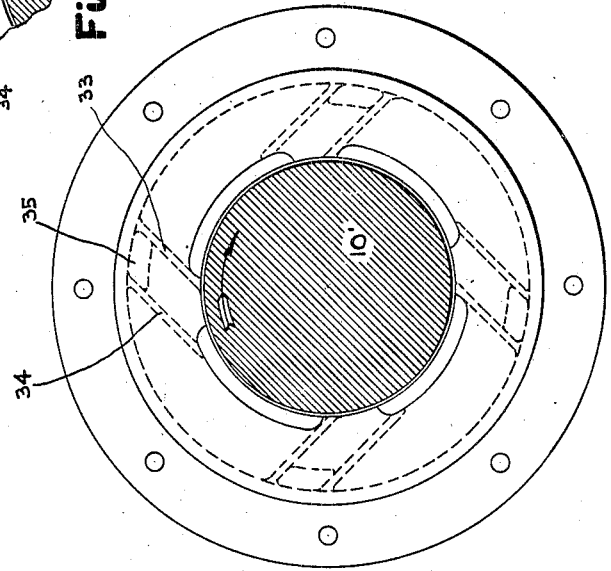
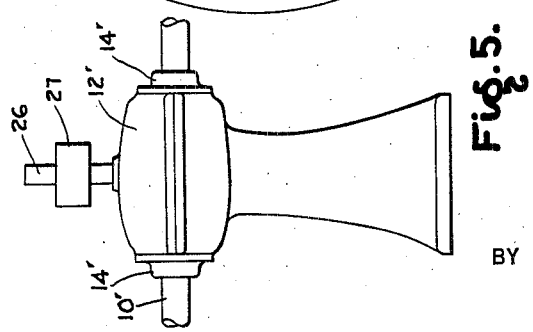
WITNESSES:
E. Lutz
INVENTOR
J. L. Ray
BY
a. B. Reavis
ATTORNEY Patented June 16, 1931

1,810,370

UNITED STATES PATENT OFFICE

JAMES L. RAY, OF SWARTHMORE, PENNSYLVANIA, ASSIGNOR TO WESTINGHOUSE ELECTRIC & MANUFACTURING COMPANY, A CORPORATION OF PENNSYLVANIA

BEARING HOUSING SEAL

Application filed March 1, 1927. Serial No. 171,823.

My invention relates to shaft packing, more particularly to packing for the clearance between a rotating shaft and the housing for a bearing of said shaft, and it has for its object to provide a simple and efficient packing of the character designated.

Labyrinth packing has heretofore been used to minimize the escape of oil vapors from the interior of a bearing housing. While such packing has been generally satisfactory, nevertheless, it is always necessary to provide a certain amount of clearance, and it has been found that some oil vapor will leak through this clearance.

In accordance with my invention, I provide an inward flow of air through this packing, thereby entirely eliminating the escape of oil vapor through the packing. I accomplish this result by providing impeller means on the shaft and developing thereby a slight pressure which is communicated to the clearance between the housing and the shaft. In this way, I provide a slight flow of air into the housing and prevent the escape of oil vapor from the housing through said clearance. Labyrinth packing is also preferably provided in said clearance in order to minimize all flow through said clearance.

Apparatus exemplifying my invention is illustrated in the accompanying drawings, in which:

Fig. 2 is a similar view of a second embodiment thereof;

Fig. 3 is an end elevation of the embodiment of Fig. 2 as seen from the left;

Fig. 4 is a transverse sectional view taken along the line IV—IV of Fig. 2; and, Fig. 5 is a side elevation of a bearing housing and the shaft extending therethrough.

Figure 1:
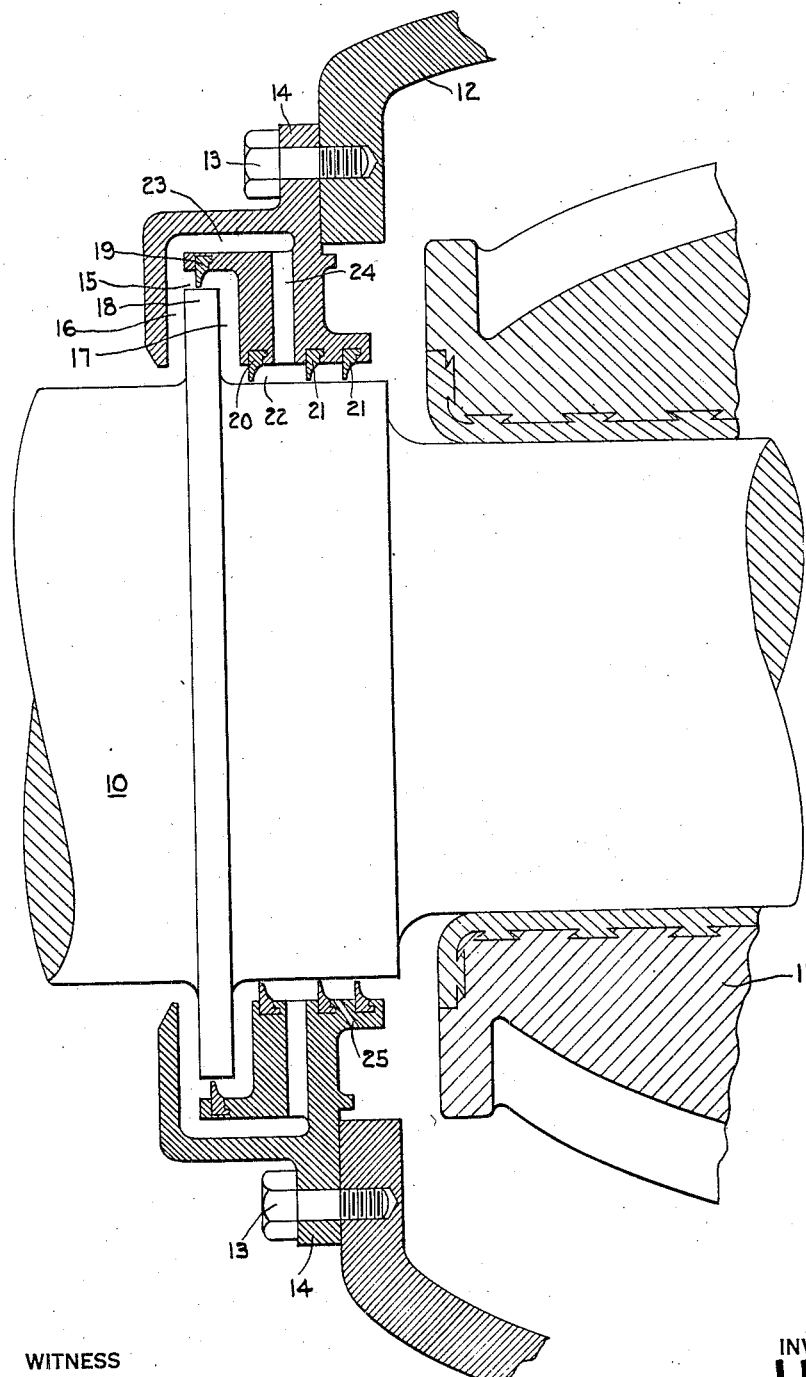
Fig. 1 is a sectional view taken longitudinally of the shaft of one embodiment of my invention.

Referring to the drawings in detail, I show a shaft 10 rotating in bearing 11, the latter being enclosed by the bearing housing 12, through which the shaft 10 extends. Secured to the housing 12, as by screws 13, is a ring 14 which carries the stationary part of the packing. The ring 14 is formed with an annular inwardly opening chamber 15.

An impeller 18, carried by the shaft, is disposed and rotates within the chamber 15. The impeller 18 is shown as formed with flat sides, although it may be of any form known to the art.

A packing element 19 is secured in the wall of the chamber 15 adjacent to the outer periphery of the impeller 18 and, together with said impeller, divides the chamber into outer and inner spaces 16 and 17, respectively. A second packing element 20 carried by the ring 14 closes the inner periphery of the space 17. Disposed inwardly of the second packing element 20 is a third packing element 21, or preferably, as shown, a plurality of such elements.

Communication is provided between the outer periphery of space 16 and the clearance space 22 at the outer side of the element or elements 21 by an annular recess 23 and a plurality of radially extending passages 24. It will be understood that such communication may be provided in any other suitable manner.

The operation of this embodiment of my invention is as follows. The impeller 18 develops a pressure of the air in chamber 15 by contact therewith in the manner of a centrifugal pump as is well understood in the art. The pressure developed at the outer periphery of space 16 is communicated through recess 23 and passages 24 to the space 22. Inasmuch as a slight clearance must be maintained between the packing elements 21 and the shaft, and as the interior of the housing is at atmospheric pressure, there will be a slight flow of air by said packing elements into the housing. The inner periphery of space 16 communicates directly with the atmosphere and is supplied with air therefrom.

The packing elements 19 and 20 prevent the flow of any substantial amount of air through space 17 and thereby nullify the pumping action on the inner side of the impeller 18. While some air will leak by these packing elements it will not be sufficient to destroy the pressure in the space 22.

The advantage of using the packing elements 19 and 20 is that it permits of the use of a smooth flat-sided impeller 18, these parts avoiding pumping action on one side of the impeller and allowing the pressure developed on the other side to be utilized for producing the inward flow. The flat-sided impeller creates but slight disturbance of the air, just sufficient pressure being generated to insure an inward flow by the packing elements 21.

Drain passages 25 may be provided at the bottom of the ring 14 to drain any oil which may condense between the several packing elements 21, as when the shaft is not rotating.

In Figs. 2, 3 and 4, I show another embodiment of my invention which has the advantage that it does not require a separate impeller on the shaft, the impelling action of the surface of the shaft being utilized in this case. The surface of a rapidly rotating shaft is surrounded by a film or layer of moving air of considerable thickness, the portion thereof next the shaft having a velocity nearly that of the surface of the latter. In accordance with my second embodiment, I provide deflectors or scoops which scrape up this rotating layer of air and convert its velocity into pressure. This pressure is utilized to provide a flow of air by the packing elements into the interior of the housing.

The shaft 10' is mounted in a bearing 11' enclosed in a housing 12'. A ring 14' secured to the housing by screws 13' carries packing members 21' in a manner similar to that of the first embodiment.

The ring 14' embodies two chambers, 30 and 31, separated by a partition 32. Within the chamber 30 are one or more deflectors 33 which scrape up the film of air surrounding and rotating with the surface of the shaft. This current of air is guided, by the deflectors 33 and guides 34, parallel therewith, through openings 35 in the partition 32, to the inner chamber 31, thereby producing a slightly higher pressure within the chamber 31. This pressure at the outer side of packing elements 21' causes a flow of air through the clearance between the packing elements 21' and the shaft, insofar as said clearance permits any flow, and thus prevents the escape of oil vapor from the housing in the same manner as the first embodiment.

It will be apparent that, in order to prevent the building up of a pressure within the housing, some form of vent means must be provided. In Fig. 5, I show a vent 26 at the top of the housing, providing communication with the atmosphere. An oil condenser or separator 27 is preferably embodied in said vent in order to prevent the escape of oil vapor through the vent. It will be apparent, however, that other means of withdrawing air or vapor from the housing might be provided.

From the above description, it will be apparent that I have provided a means for inducing an inward flow of air, insofar as any flow is permitted by the labyrinth packing elements, and that the escape of oil vapor through the packing is thereby entirely avoided. While there is an outward flow of air from the interior of the housing through the vent, the oil vapor entrained in this air can be readily condensed or separated therefrom.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claim.

What I claim is:

An oil vapor seal for the clearance space between a bearing housing and a shaft projecting through a wall thereof, comprising a member carried by the housing and providing outer and inner annular chambers having a partition therebetween and open sides facing the shaft, said partition having an opening therein spaced from the inner periphery thereof, and a deflector carried by said member and disposed in the outer chamber for deflecting the moving film of air surrounding the shaft when rotating and directing the same away from the shaft and through said opening to the inner chamber.

In testimony whereof, I have hereunto subscribed my name this tenth day of February, 1927.

JAMES L. RAY.